US010779025B2

United States Patent
Godfrey et al.

(10) Patent No.: US 10,779,025 B2
(45) Date of Patent: Sep. 15, 2020

(54) AUTOMATIC IDENTIFICATION AND VERIFICATION OF TRANSMISSION OF CONTENT

(71) Applicant: Disney Enterprises, Inc., Burbank, CA (US)

(72) Inventors: Glenn J. Godfrey, Montville, NJ (US); Gerald A. Rapella, Belford, NJ (US); Michael J. Strein, Bohemia, NY (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/190,009

(22) Filed: Nov. 13, 2018

(65) Prior Publication Data
US 2020/0154160 A1    May 14, 2020

(51) Int. Cl.
*H04H 20/14*      (2008.01)
*H04H 60/29*      (2008.01)
*H04N 21/2547*   (2011.01)
*G10L 19/018*     (2013.01)
*H04N 21/81*      (2011.01)

(52) U.S. Cl.
CPC ....... *H04N 21/2547* (2013.01); *G10L 19/018* (2013.01); *H04N 21/812* (2013.01)

(58) Field of Classification Search
None
See application file for complete search history.

(56) References Cited

U.S. PATENT DOCUMENTS

| | | | | |
|---|---|---|---|---|
| 6,209,094 B1* | 3/2001 | Levine | ................... | G06T 1/005 375/E7.018 |
| 9,497,505 B2* | 11/2016 | Heffernan | ........ | H04N 21/44008 |
| 10,257,567 B2* | 4/2019 | Petrovic | .................. | G06F 21/16 |
| 10,447,768 B1* | 10/2019 | Parekh | ............... | H04N 21/2353 |
| 2006/0146787 A1* | 7/2006 | Wijnands | ............... | H04H 60/46 370/352 |
| 2007/0261072 A1* | 11/2007 | Boulet | .................. | G06Q 30/02 725/14 |
| 2008/0115171 A1* | 5/2008 | Barsness | .................. | H04N 5/76 725/58 |

(Continued)

OTHER PUBLICATIONS

FCC 96-335, "In the Matter of Policies and Rules Concerning Children's Television Programming", Released Aug. 8, 1996. < Retrieved from Internet Oct. 29, 2019> <https://transition.fcc.gov/Bureaus/Mass_Media/Orders/1996/fcc96335.htm#IInitiatives> (Year: 1996).*

(Continued)

*Primary Examiner* — William J Kim
(74) *Attorney, Agent, or Firm* — Patterson + Sheridan, LLP (57) ABSTRACT

Techniques for identifying aired content are described. A first audio sample is received and processed, using a computer processor, to extract an embedded audio watermark. A content identifier identifying a first item of programming content is determined, using the computer processor and based on the audio watermark. A timestamp associated with the first audio sample is also determined based on the audio watermark. An as-aired log is updated based on the content identifier and the timestamp. The computer processor is used to identify that the first item of programming content has aired, based on the as-aired log.

20 Claims, 7 Drawing Sheets

(56) References Cited

U.S. PATENT DOCUMENTS

| | | | |
|---|---|---|---|
| 2008/0216107 A1* | 9/2008 | Downey | H04N 7/17318 725/22 |
| 2008/0301727 A1* | 12/2008 | Cristofalo | G06Q 30/02 725/35 |
| 2009/0070808 A1* | 3/2009 | Jacobs | H04N 7/162 725/36 |
| 2010/0119208 A1* | 5/2010 | Davis | H04N 5/765 386/291 |
| 2013/0007298 A1* | 1/2013 | Ramaswamy | H04N 21/2353 709/231 |
| 2013/0007790 A1* | 1/2013 | McMillan | H04H 60/43 725/14 |
| 2013/0152210 A1* | 6/2013 | Petrovic | G06F 21/10 726/26 |
| 2013/0305269 A1* | 11/2013 | Verma | H04N 21/2543 725/5 |
| 2015/0023546 A1* | 1/2015 | Strein | G10L 19/018 382/100 |
| 2018/0063558 A1* | 3/2018 | Stefanidis | H04N 21/232 |
| 2018/0146245 A1* | 5/2018 | Petrovic | G06F 21/16 |

OTHER PUBLICATIONS

SMPTE Reccomended Practice, "Open Binding of Distribution Channel IDs and Timestamps (OBID-TLC)—Conformance Test Materials," SMPTE RP 2112-21:2018, Approved Apr. 17, 2018, 7 pages.

SMPTE Standard, "Open Binding of Distribution Channel IDs and Timestamps (OBID-TLC)," SMPTE ST 2112-20:2018, Approved Apr. 16, 2018, 25 pages.

SMPTE Recommended Practice, "Open Binding of Content Identifiers (OBID)—Conformance Test Materials," SMPTE RP 2112-11:2018, Approved Mar. 21, 2018 , 4 pages.

SMPTE Standard, "Open Binding of Content Identifiers (OBID)," SMPTE ST 2112-10:2018, Approved Mar. 16, 2018, 22 pages.

\* cited by examiner

AUTOMATIC IDENTIFICATION AND VERIFICATION OF TRANSMISSION OF CONTENT

BACKGROUND

Field of the Invention

Embodiments presented in this disclosure relate generally, though not exclusively, to automatic identification and verification of transmission of content.

Description of the Related Art

Television networks can use a "Post-Air" log to identify content that has aired. Networks can use the post-air log for multiple purposes. For example, networks can use the post-air log to detect any deviation from the planned schedule, such as breaking news or a technical problem during transmission, to detect compliance with government or network requirements (e.g., a particular required number of hours of children's programming, or public programming), and to verify that advertisements have aired, to facilitate accurate billing.

A network can initially generate the post-air log using a content playback system 'As-Run' and a Traffic, Log, and Billing (TLB) system at the network. But a person at the network is then required to manually vet and modify the log, to account for last minute changes to what airs over the network. For example, the actual content that airs might differ from the scheduled content—expected content might be pre-empted by breaking news, a longer than scheduled live event (e.g., a sporting event or awards show), or for other reasons. As another example, a technical error might alter the content that is transmitted (e.g., if a transmitter has to change from a primary to a backup or fail-over system or a scheduled 0:30 second commercial actually aired for only 0:22 seconds). A network employee keeps track of what actually aired, and manually prepares the post-air log. But this manual intervention is expensive, inefficient, and potentially inaccurate. It can take significant time for an employee to prepare the post-air log. Further, the accuracy of the log depends on the accuracy of the employee doing the preparation.

SUMMARY

Embodiments described herein include a method of identifying aired content. The method includes processing a first audio sample, using a computer processor, to extract an embedded audio watermark. The method further includes determining, using the computer processor, a content identifier identifying a first item of programming content, based on the audio watermark. The method further includes determining, using the computer processor, a timestamp associated with the first audio sample, based on the audio watermark. The method further includes updating, using the computer processor, an as-aired log based on the content identifier and the timestamp. The method further includes identifying, using the computer processor, that the first item of programming content has aired, based on the as-aired log.

Embodiments described herein further include a computer program product for identifying aired content. The computer program product includes a computer-readable storage medium having computer-readable program code embodied therewith, the computer-readable program code executable by one or more computer processors to perform an operation. The operation includes processing a first audio sample to extract an embedded audio watermark. The operation further includes determining a content identifier identifying a first item of programming content, based on the audio watermark. The operation further includes determining a timestamp associated with the first audio sample, based on the audio watermark. The operation further includes updating an as-aired log based on the content identifier and the timestamp. The operation further includes identifying that the first item of programming content has aired, based on the as-aired log.

Embodiments described herein further include a system. The system includes a processor and a memory storing a program, which, when executed on the processor, performs an operation. The operation includes processing a first audio sample to extract an embedded audio watermark. The operation further includes determining a content identifier identifying a first item of programming content, based on the audio watermark. The operation further includes determining a timestamp associated with the first audio sample, based on the audio watermark. The operation further includes updating an as-aired log based on the content identifier and the timestamp. The operation further includes identifying that the first item of programming content has aired, based on the as-aired log.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Aspects of the present disclosure relate to automatic verification of transmitted content. Instead of (or in addition to) relying on manual intervention, a television network can embed a digital watermark in content before transmission, and use this digital watermark to identify the content that actually airs. By integrating this verification with a TLB system (or another suitable system), the network can generate an "as-aired" log that is more accurate and more efficient, avoiding the cost and risk of errors associated with manual intervention.

In an embodiment, an audio watermark can be added to audiovisual (or purely audio) content prior to transmission to a user. The content can then be monitored, and the audio can be processed to extract the audio watermark. The audio watermark can be correlated with an identifier for the aired content, to accurately verify the content that has actually aired, and to generate an as-aired log. A television network can then use this as-aired log to determine compliance with airtime requirements and to improve and automate additional processes. For example, the television network can use the as-aired log to accurately determine compliance with network and licensing requirements. As another example, the television network can use the as-aired log to determine whether a technical error has occurred in transmission. As another example, the television network can use the as-aired log to accurately determine what advertising content has aired, and to help automate the billing of advertisements.

One or more embodiments herein are discussed in the context of a television network. But this is merely one embodiment. One or more techniques described herein could be applied to audio-only content, including terrestrial and satellite radio, streaming audio content, and recorded audio content, or visual-only content. Further, one or more techniques described herein could be used for Internet based content delivery platforms, satellite-based content deliver platforms, or any other content delivery platform.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations or block diagrams of methods, apparatus (systems) and computer program products according to embodiments of the invention. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present disclosure, a user may access applications (e.g., the modules of the verification server 200) or related data available in the cloud. For example, the content tracking module 230, described in further detail below in relation to FIG. 2, could execute on a computing system in the cloud and identify transmitted content. In such a case, the content tracking module 230 could lookup content and store content identifiers and an as-aired log at a storage location in the cloud. Doing so allows a user to access this information from any computing system attached to a network connected to the cloud (e.g., the Internet).

Figure 1:
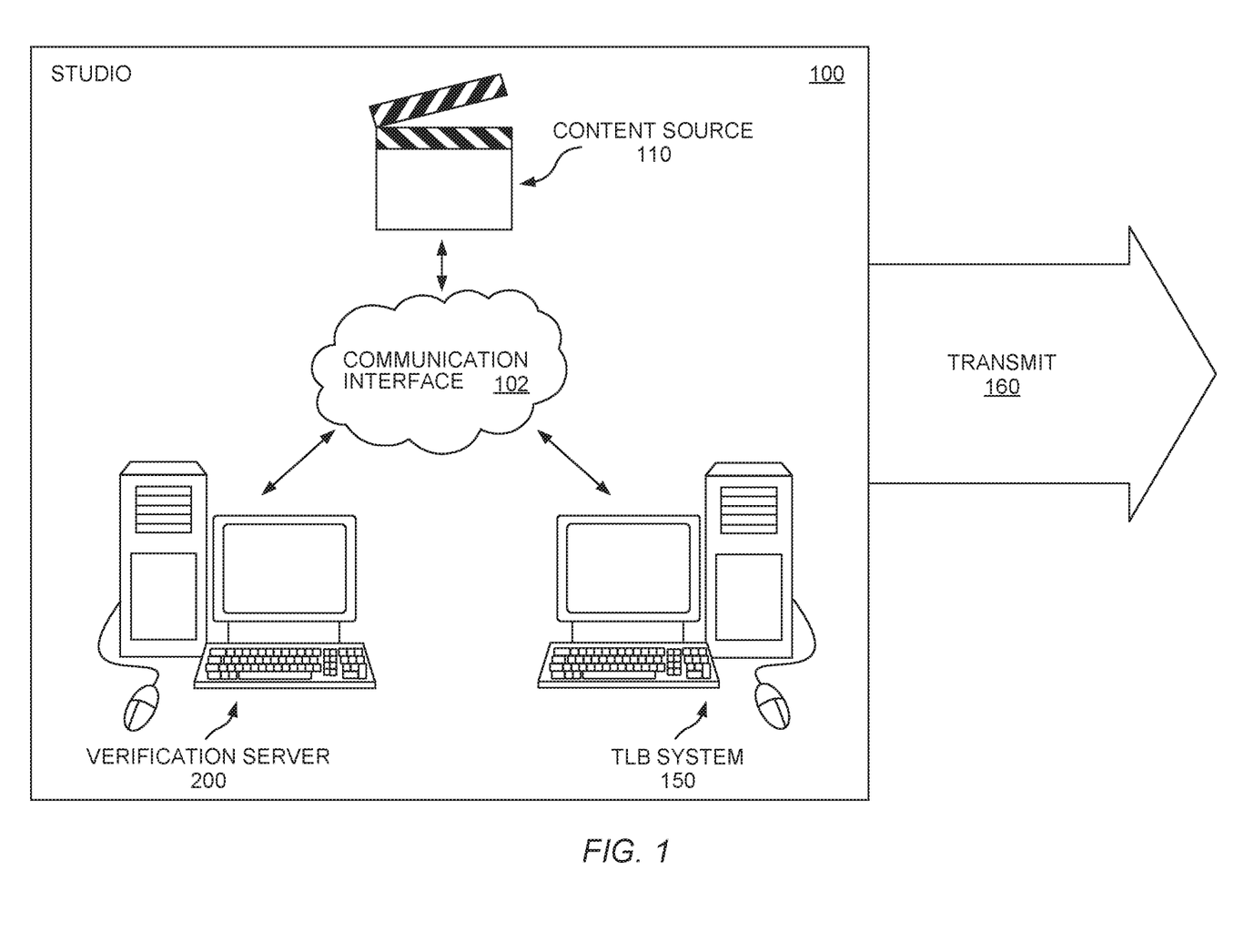
FIG. 1 is a block diagram illustrating automatic verification of content transmission, according to one embodiment described herein.

FIG. 1 is a block diagram illustrating automatic verification of content transmission, according to one embodiment described herein. A network studio 100 (e.g., a television studio) includes a content source 110. The network studio 100 can be any studio associated with transmitting content. For example, the network studio 100 can be a studio for a main broadcast network, a studio for a network affiliate, a studio for a cable network, a studio for a streaming or Internet network, etc. Further, the network studio 100 need not be a studio—the network studio 100 can be any suitable content transmission source. The content source 110 provides the content for transmission. The content source 110 can include pre-recorded programming, advertisements, Promotion, public service announcements, live programming, and any other suitable content. The content source 110 is in communication with a communication interface 102. In an embodiment, the content source 110 is a computer server with suitable software and hardware to connect with the communication interface 102.

The communication interface 102 can use any suitable transmission interface, including a dedicated audio/video transmission interface. In an embodiment, the communication interface 102 uses an analog interface, for example a National Television System Committee (NTSC) interface, a Phase Alternating Line (PAL) interface, or another suitable interface. In another embodiment, the communication interface 102 uses a digital interface, for example a Serial Digital Interface (SDI).

In a further embodiment, the communication interface 102 uses a suitable communications network, for example the Internet, a local access network, a mesh network, or a wide access network. The communication interface 102 can use any suitable network protocol, including any suitable wired or wireless protocol. For example, the communication interface 102 can use an IEEE Wi-Fi standard, like an 802.11 standard, cellular protocols (including 3G, LTE, 4G and others), and Bluetooth.

In an embodiment, the communication interface 102 can include a combination of a dedicated audio/video transmission interface and a communications network. For example, the verification server 200 can embed and decode watermarks in content using a dedicated audio/video interface (e.g., SDI or NTSC). The verification server 200 can then perform additional operations related to the watermarks using a communications network (e.g., a local access network or the Internet).

The network studio 100 further includes a Traffic, Log, and Billing (TLB) system 150. In an embodiment, the TLB system 150 is a commercially available TLB system. For example, the TLB system 150 can be a system from Operative, WideOrbit Inc., or another suitable system. The TLB system 150 is generally configured to manage certain aspects of the network studio 100. For example, the TLB system 150 can manage scheduling, advertisement sales and billing, inventory management, traffic monitoring, security, reporting, and other features. The TLB system 150 is also in communication with the communication interface 102. In an embodiment, the TLB system 150 includes suitable software and hardware connected with the communication interface 102.

In an embodiment, the TLB system 150 is configured to interface with an automation system to control equipment in the studio 100. For example, the TLB system 150 can provide data and commands to an automation system, and the automation system can control the equipment (e.g., program origination equipment or other suitable equipment in the studio 100). In an embodiment, the TLB system 150 includes the automation system. In another embodiment, the TLB system 150 is partially (or entirely) separate from the automation system.

The network studio 100 further includes a verification server 200. The verification server 200 is generally configured to integrate with the TLB system 150 and to facilitate verification of content transmitted by the network studio 100. The verification server 200 is discussed in further detail with regard to FIG. 2. The verification server 200 is also in communication with the communication interface 102. In the illustrated embodiment of FIG. 1, the verification server 200, TLB system 150, and content source 110 are separate components. Alternatively, one or more of these components could be integrated together in a computer server or a cloud computing environment. For example, the verification server 200 and the TLB system 150 can be combined in a single server.

The network studio 100 generally includes components configured to transmit a media stream to viewers. The transmission 160 can be a real-time live transmission, or a recorded transmission. The transmission 160 can use any suitable transmission method, including wireless transmission (e.g., an over-the-air television broadcast, a satellite television broadcast, or a wireless IP transmission), wired transmission (e.g., a cable television broadcast or a wired IP transmission), or any other suitable transmission method. The viewers can view the media stream on any suitable device, including a television, a computer, a smartphone, a tablet, etc.

Figure 2:
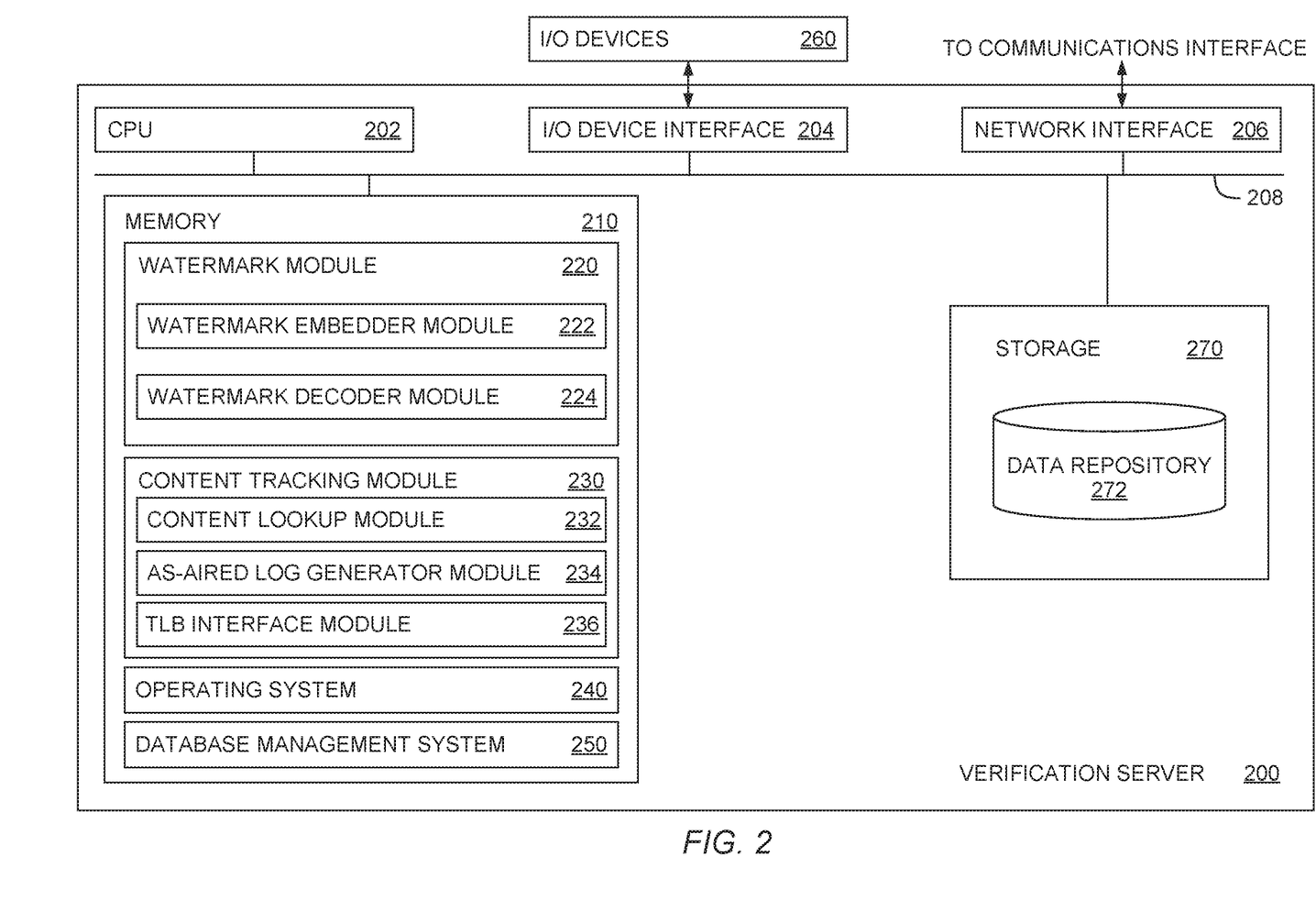
FIG. 2 is a block diagram illustrating a verification server, according to one embodiment described herein.

FIG. 2 is a block diagram illustrating a verification server 200, according to an embodiment. As shown, the verification server 200 includes, without limitation, a central processing unit (CPU) 202, a network interface 206, a memory 210, and storage 270, each connected to a bus 208. The verification server 200 also includes an I/O device interface 204 for connecting to I/O devices 260 (e.g., keyboard, display and mouse devices). Further, in context of this disclosure, the computing elements shown in the verification server 200 may correspond to a physical computing system (e.g., a system in a data center) or may be a virtual computing instance executing within a computing cloud, as discussed further above.

The CPU 202 retrieves and executes programming instructions stored in the memory 210 as well as stores and retrieves application data residing in the storage 270. The bus 208 is used to transmit programming instructions and application data between the CPU 202, the I/O device interface 204, the storage 270, the network interface 206, and the memory 210. The CPU 202 is included to be representative of a CPU, multiple CPUs, a single CPU having multiple processing cores, graphics processing units (GPUs) having multiple execution paths, and the like. The memory 210 is generally included to be representative of electronic storage of any suitable type(s), including random access memory or non-volatile storage. The storage 270 may be a disk drive storage device. Although shown as a single unit, the storage 270 may be a combination of fixed or removable storage devices, such as fixed disc drives, removable memory cards, network attached storage (NAS), or a storage area-network (SAN).

Illustratively, the memory 210 includes an operating system 240 and a database management system (DBMS) 250, while the storage 270 includes a data repository 272 (e.g., a database). The operating system 240 generally controls the execution of application programs on the verification server 200. Examples of operating system 240 include, without limitation, versions of UNIX, distributions of the Linux® operating system, versions of Microsoft® Windows® and so on. The DBMS 250 generally facilitates the capture and analysis of data in the data repository 272 (e.g., content verification data). For instance, the DBMS 250 could enable the definition, creation, querying, update and administration of the data repository 272. As an example, the DBMS 250 could receive a query (e.g., composed using Structured Query Language (SQL)) and, in response, could generate an execution plan that includes one or more access routines to be run against the data repository 272. The DBMS 250 could then execute the access routine(s) and could return any query result data to the requestor.

The memory 210 generally includes program code for performing various functions related to automatic verification of transmitted content. The program code is generally described as various functional "applications," "components," or "modules" within the memory 210, although alternate implementations may have different functions or combinations of functions. Within the memory 210, the watermark module 220 is generally configured to embed and decode watermarks in content. In an embodiment, the watermark module 220 includes a watermark embedder module 222 configured to embed an audio watermark in content prior to transmission. This is discussed in more detail in relation to FIG. 3, below. In an embodiment, the watermark module 220 further includes a watermark decoder module 224. The watermark decoder module 224 is generally configured to extract and decode an audio watermark from content. This is discussed in more detail with regard to FIGS. 3 and 5, below.

The memory 210 further includes a content tracking module 230. In an embodiment, the content tracking module 230 includes a content lookup module 232. The content lookup module 232 is generally configured to lookup a content identifier based on a watermark (e.g., an audio watermark embedded in the content). In an embodiment, the content lookup module 232 uses data stored in the storage 270 for this lookup. This data can be stored locally on the verification server 200, on another local server (e.g., another server located in the network studio 100), on a server accessible over the Internet, or in a cloud computing server.

In an embodiment, the content tracking module 230 further includes an as-aired log generator module 234. In an embodiment, the as-aired log generator module 234 is generally configured to generate a verified list of content transmitted by the network studio 100. This is discussed in further detail with regard to FIGS. 4 and 6, below. In an embodiment, the content tracking module 230 further includes a TLB interface module 236. The TLB interface module 236 is generally configured to provide an interface between the content tracking module 230 and a Traffic, Log, and Billing (TLB) system (e.g., the TLB system 150 illustrated in FIG. 1).

Figure 3:
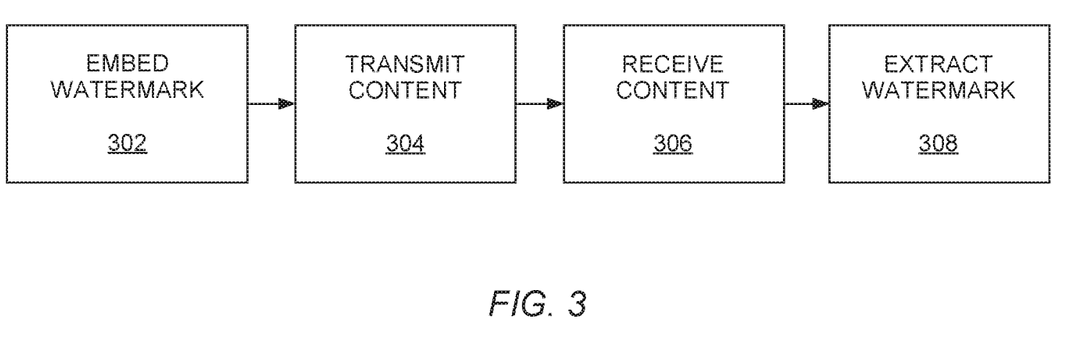
FIG. 3 is a block diagram illustrating embedding and extracting a watermark from content, according to one embodiment described herein.

FIG. 3 is a block diagram illustrating embedding and extracting a watermark from content, according to one embodiment described herein. At block 302 a watermark module (e.g., the watermark embedder module 222 illustrated in FIG. 2) embeds a watermark in the content. In an embodiment, this is an audio watermark. Audio watermarking is a signal processing technology that enables the embedding of digital data information into the audio signal itself. For example, the audio watermarking techniques associated with Open Binding of Content Identifiers (OBID) could be used. OBID techniques are described in the SMPTE standard 2112. The documents SMPTE ST 2112-10:2018 and SMPTE ST 2112-20:2018, relating to this standard, are hereby incorporated by reference in their entirety for the disclosure of audio watermarking.

OBID techniques can be used to bind content identifiers to audiovisual content so that the content identifiers survive processing during transmission to the viewer. The content can then be accurately identified, regardless of the transmission method and path. The watermark embedder module 222 receives the original, unmarked, content, including an audio signal. At block 302, the watermark embedder module 222 performs signal processing techniques to embed an audio watermark in the content stream.

At block 304, the network studio (e.g., the network studio 100 illustrated in FIG. 1) transmits the watermarked content. In an embodiment, the watermark is added at the network studio 100 (as discussed above). Alternatively, the content is provided to the network studio 100 with the watermark (e.g., the content source 110 includes already-watermarked content). In an embodiment, the watermark embedder module 222 embeds a watermark into pre-recorded content, and the pre-recorded content is transmitted at block 304. Alternatively, the watermark embedder module 222 embeds a watermark in live content, and the live content is transmitted at block 304.

At block 306, the verification server (e.g., the verification server 200) receives the watermarked content. In an embodiment, the verification server 200 monitors content prior to transmission to viewers. For example, the verification server 200 can monitor content within the network studio 100 shortly prior to transmission. Alternatively, the verification server 200 monitors content after it has been transmitted to viewers. For example, the verification server 200 can monitor content shortly after it has been transmitted from the network studio 100, or after the content has been received by the viewer.

At block 308, a watermark decoder module (e.g., the watermark decoder module 224 illustrated in FIG. 2) extracts the watermark from the content. In an embodiment, the watermark is an audio watermark and OBID techniques (as discussed above) are used to extract the audio watermark. This is discussed in further detail in relation to FIG. 5, below.

Figure 4:
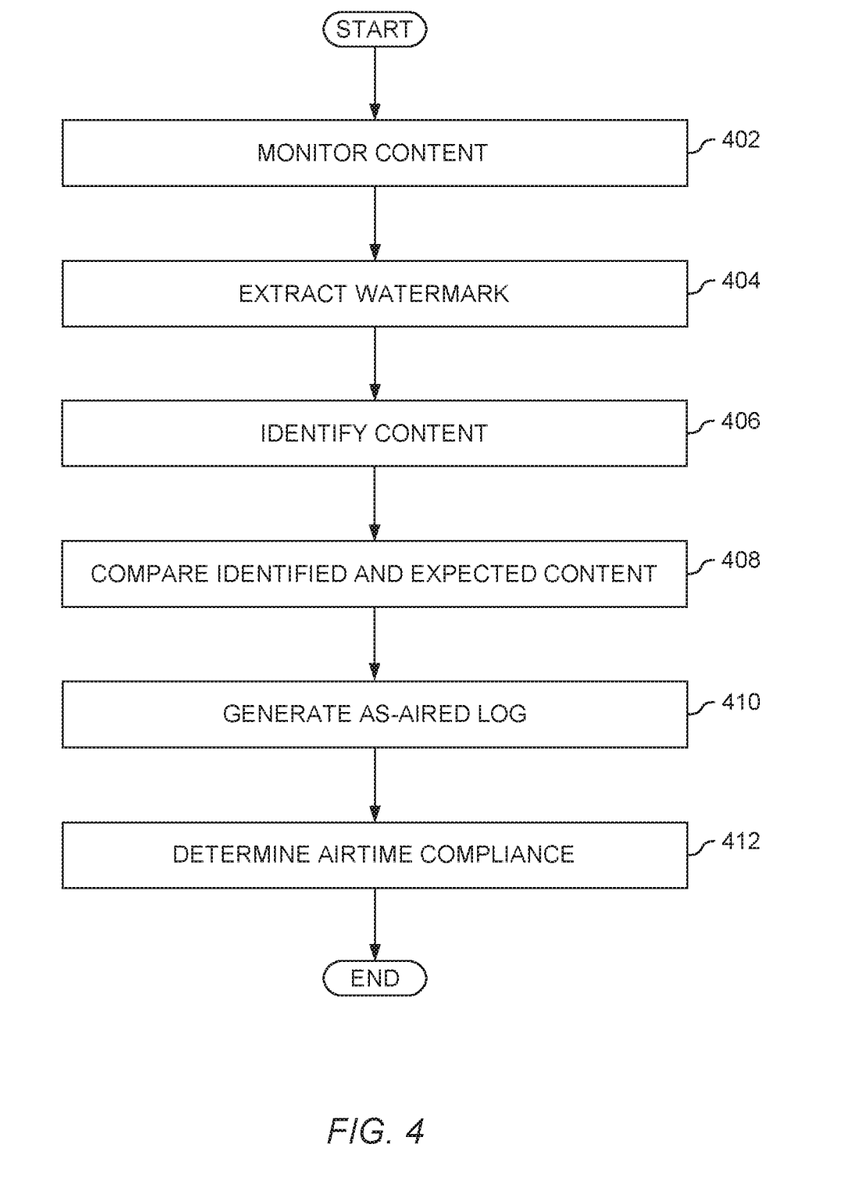
FIG. 4 is a flow chart illustrating automatic verification of content transmission, according to one embodiment described herein.

FIG. 4 is a flow chart illustrating automatic verification of content transmission, according to one embodiment described herein. At block 402, a verification server (e.g., the verification server 200 illustrated in FIG. 2) monitors the content for a watermark. In an embodiment, the content includes an audio watermark (e.g., an OBID audio watermark as discussed above). In an embodiment, the verification server 200 monitors the content prior to transmission to users. Alternatively, the verification server 200 monitors the content after transmission to users. In an embodiment, the content has had a watermark added previously (e.g., using a watermark embedder module like the watermark embedder module 222 illustrated in FIG. 2). In another embodiment, the verification server 200 adds the watermark prior to transmission (e.g., using the watermark embedder module 222).

At block 404, a watermark decoder module (e.g., the watermark decoder module 224 illustrated in FIG. 2) extracts the watermark from the content. This is discussed in more detail in relation to FIG. 5. At block 406, a content lookup module (e.g., the content lookup module 232 illustrated in FIG. 2) identifies the content. In an embodiment, the verification server 200 maintains a local lookup table correlating watermarks with content identifiers. This local lookup table can include a partial list of content. For example, the local lookup table could operate as a cache for recently identified content, or could be populated with commonly identified content. A global lookup table can be maintained at another storage location (e.g., the storage 270 illustrated in FIG. 2, or a cloud storage location). In this embodiment, the content lookup module 232 first looks in the local lookup table for the content identifier corresponding to the identified content. If the content lookup module 232 is not able to find the corresponding content identifier in the local lookup table, the content lookup module 232 can look in the global lookup table. Alternatively, the verification server 200 can maintain a local lookup table of all content watermarks and identifiers. As another alternative, the verification server 200 does not maintain a local lookup table, and the content lookup module 232 accesses a global lookup table instead.

In an embodiment, the content identifier used by the content lookup module 232 can be maintained by a registration authority. In this embodiment, the registration authority is responsible for maintaining a correlation between watermarks and content identifiers. In this embodiment, the content lookup module 232 queries the registration authority for the content identifier (in addition to, or instead of, accessing a local lookup table in the verification server 200). Alternatively, the correlation between watermarks and content identifiers can be maintained by the verification server 200 or another component of the network studio 100. For example, for content created by a network, it may be sufficient to maintain the correlation locally, rather than relying on a registration authority.

Further, in an embodiment, the content lookup module 232 analyzes the watermark to identify a timestamp relating to the content. For example, in one embodiment, the watermark includes a timestamp denoting when the content was broadcast. The Open Binding of Distribution Channel IDs and Timestamps (OBID-TLC) standard, SMPTE ST 2112-20:2018, describes binding distribution IDs and timestamps to media using audio watermarking. The content lookup module 232 can identify the timestamp as part of extracting the watermark, as discussed above in relation to block 404 and below in relation to FIG. 5. The content lookup module 232 can provide the timestamp from the watermark to the as-aired log generator module 234 (along with the content identifier) for use in generating the as-aired log. This is discussed in more detail with regard to block 410 in FIG. 4 and in relation to FIG. 6.

Alternatively, the watermark itself may not include a timestamp denoting when the content was broadcast. In this embodiment, the content lookup module 232 itself can generate a timestamp based on when the content is identified. The content lookup module 232 can then provide this timestamp to the as-aired log generator module 234 (along with the content identifier) for use in generating the as-aired log, as discussed with regard to block 410 in FIG. 4 and in relation to FIG. 6.

At block 408, a content lookup module (e.g., the content lookup module 232 illustrated in FIG. 2) compares the content identified at block 406 with expected content. In one embodiment, the verification server 200 compares the identified content with a list of content that is expected to air. As one example, if the expected content is pre-recorded, a TLB system (e.g., the TLB system 150 illustrated in FIG. 1), or another suitable system, provides an expected schedule (e.g., in XML, as a text file, in a proprietary format, or in any other suitable format) to the verification server 200. In an embodiment, the expected schedule includes timestamps or other information identifying when content is scheduled to air. The verification server 200 compares the identified content with the content expected to air, according to the expected schedule. In an embodiment, if the identified content does not match the expected content in the expected schedule, the verification server 200 can modify the expected schedule to include the content that actually aired, as identified at block 406. In this embodiment, the verification server 200 can provide the modified schedule back to the TLB system (or other suitable system). The TLB system can then maintain an accurate schedule of the content that aired. This can be used in addition to, or in place of, an as-aired log as discussed below. Further, if the identified content does not match the expected content in the expected schedule, the verification server 200 can take an action, for example triggering an exception or alert relating to the discrepancy.

As another example, if the content is broadcast live, the TLB system may not maintain an expected schedule. Instead, the TLB system may maintain a list of programming pods of content to air in a particular interval or during a particular event. For example, the TLB system can maintain pods of commercials, interstitials, promotions, or other content to air during a particular time period, during a particular live broadcast, or during a particular period of a live broadcast (e.g., during halftime of a sporting event). In this example, the TLB system can provide to the verification server 200 information about the programming pods, and the verification server 200 can compare the identified content with the expected content based on the pods. The verification server 200 can take an appropriate action if it identifies a discrepancy (e.g., providing an alert), and can generate a log of actually aired content (e.g., an as-aired log as discussed below).

Further, as discussed above, the verification server 200 can monitor content before, or after, the content airs to consumers. In an embodiment, the verification server 200 can monitor content (e.g., as discussed in relation to block 402), extract a watermark (e.g., as discussed in relation to block 404), and identify the content (e.g., as discussed in relation to block 406) before the content airs to consumers.

The verification server 200 can then also monitor the content after the content airs. The verification server 200 can compare the expected content (identified before airing) with the content that actually aired (identified after airing). In an embodiment, the verification server 200 can identify any discrepancies, and can take an action (e.g., triggering an alert). For example, this discrepancy could indicate a technical problem with transmission of the content or another error (e.g., an error in what content aired, or an error relating to a portion of a program). In an embodiment, the verification server 200 triggers an alert to identify the problem or error, or takes another suitable action.

Further, if the identified content does not match the expected content, this could signal a problem with the expected content list or expected schedule in the TLB system. The verification server 200 could trigger an alert that the expected content list is inconsistent, or could identify a different expected content list.

At block 410, an as-aired log generator module (e.g., the as-aired log generator module illustrated in FIG. 2) generates an as-aired log using the identified content. This is discussed in more detail in relation to FIG. 6, below.

At block 412, a content tracking module (e.g., the content tracking module 230 illustrated in FIG. 2) determines airtime compliance, based on the as-aired log. This can be done by the TLB interface module 236, another module within the content tracking module 230, or any other suitable module. In an embodiment, the content tracking module determines airtime compliance by identifying programming content that has aired, based on the as-aired log.

The as-aired log can be used for many purposes. In one embodiment, a television network may have governmental or licensing requirements to air a particular number of hours of programming per day, week, month, quarter, year, etc. For example, a television network may be required to air a particular number of hours of children's programming each day. At block 412, the content tracking module 230 can use the as-aired log to determine whether the network has complied with this requirement.

For example, in an embodiment the content tracking module 230 retrieves and parses a data structure relating to the requirement (e.g., an XML file), identifies the requirement, and determines compliance with the identified requirement based on the as-aired log. For example, the content tracking module 230 can parse the as-aired log to identify content that has aired, and can use this to determine compliance with the identified requirement. In an embodiment, the requirement can be stored locally on the verification server, or remotely. Further, the requirement can be generated by a user or by a third party (e.g., a governmental entity or an advertiser).

In one embodiment, the requirement itself can include logic for the content tracking module 230 to use in determining compliance. For example, the content tracking module can parse the as-aired log and use the logic associated with the requirement to determine compliance with the requirement. Alternatively, the content tracking module 230 can itself include logic to use in determining compliance, or can retrieve rules (e.g., from a local or remote storage location) that include logic to use in determining compliance. In an embodiment, the content tracking module 230 can trigger a notification or alert providing notice of compliance or non-compliance. Further, the content tracking module 230 can generate a report identifying the compliance or non-compliance, or identifying discrepancies between content that was expected to air and content that did air (e.g., an exceptions report).

Alternatively, the TLB interface module 236 can automatically modify the broadcast schedule in the future to ensure compliance. For example, the content tracking module 230 can use the as-aired log to determine that expected children's programming did not air as expected, and can schedule the programming for another suitable time to compensate. As another example, a broadcaster may be required to air a particular number of Public Service Announcements (PSAs) during a time period. The content tracking module 230 can use the as-aired log to determine compliance with this requirement, and can take appropriate remedial action (e.g., an alert, or an automatic schedule change, as discussed above).

In another embodiment, the content tracking module 230 can use the as-aired log to identify technical issues or failures. In an embodiment, a network can include a main system and a backup or fail-over system. The backup system can transmit content with a different watermark than the main system. The content tracking module 230 can use the as-aired log to determine that the content from the backup system has aired, identifying a technical issue or failure.

In another embodiment, the content tracking module 230 can use the as-aired log to determine compliance with advertising requirements. For example, a television network may have been paid to air a particular commercial or other advertising content (e.g., a promo, an infomercial, etc.) at a particular time or for a particular duration (e.g., for 30 seconds within a particular 30 minute block, or during a particular live event). The content tracking module 230 can use the as-aired log to determine compliance with this requirement, and can take appropriate action. In an embodiment, if the content tracking module 230 determines compliance, the TLB interface module 236 can bill the advertiser for the aired commercials.

In another embodiment, if the content tracking module 230 determines non-compliance, it can take a number of actions. As one example, the TLB interface module 236 can modify the bill to ensure that the advertiser is only charged for advertisements that actually aired. As another example, the content tracking module 230 can provide a warning or alert indicating that an advertising requirement has not been met. As another example, the TLB interface module 236 can automatically schedule the required advertising to run at a suitable time.

In a further embodiment, the content tracking module 230 can use the as-aired log to aid in the process of billing advertisers. For example, an advertiser may have agreed to pay a particular fee each time an advertisement airs. The content tracking module 230 can use the as-aired log to determine when the advertisement actually aired. The TLB interface module 236 can then bill the advertiser appropriately based on the actual airing of the advertisement.

Figure 5:
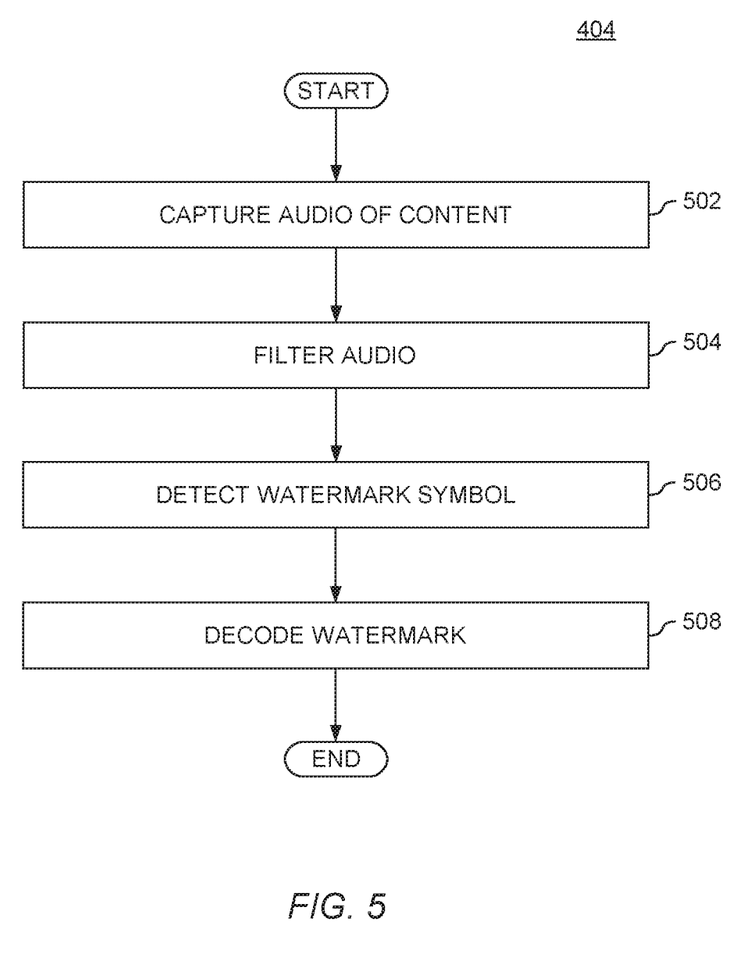
FIG. 5 is a flow chart illustrating extracting an audio watermark from content, according to one embodiment described herein.

FIG. 5 is a flow chart illustrating extracting an audio watermark from content, according to one embodiment described herein. In an embodiment, FIG. 5 corresponds with block 404, discussed above in relation to FIG. 4. In an embodiment, the audio watermark is an OBID watermark and the techniques described in the OBID standard (e.g., SMPTE ST2112-10:2018), are used to extract the watermark. Alternatively, other suitable watermarking techniques could be used.

At block 502, a watermark decoder module (e.g., the watermark decoder module 224 illustrated in FIG. 2) captures an audio sample of the content. At block 504, the watermark decoder module 224 filters the audio sample. In an embodiment, the watermark decoder module 224 can use an audio filter to reduce any signal interference in the audio sample. At block 506, the watermark decoder module 224 detects a watermark symbol in the audio sample. For example, as described for the OBID standard, symbol detection involves a three step process: (1) cross-correlation with the filtered input signal, (2) peak processing to compensate for acoustic path propagation, and (3) a symbol metrics calculation. The symbol detector can then determine the detected symbol, and its confidence. While block 506 is described in relation to the OBID standard, this is merely one embodiment. Other suitable techniques could be used.

At block 508, the watermark decoder module (e.g., the watermark decoder module 224 illustrated in FIG. 2) decodes the watermark using the detected symbol. In one embodiment, as described for the OBID standard, the watermark decoder module can use a First In First Out (FIFO) buffer to store incoming reliable detected symbols with their detection time. The watermark decoder module 224 can then extract the watermark using the FIFO buffer.

In an embodiment, as described in the OBID standard, the watermark can include one or more packets carrying one or more payloads, each payload made up of a number of data bits. The start of each packet can be defined using a specific synchronization symbol. The payload can encode a content identifier, a timestamp, or both, using the data bits. The watermark decoder module can identify the start of a packet using the synchronization symbol, and can identify the payload within the packet and reproduce the data bits as part of decoding the watermark. The content identifier module can then use the bits to identify the content (and timestamp, if the watermark includes a timestamp) associated with the watermark. As discussed, the OBID techniques are merely one embodiment. Other suitable watermarking techniques could be used.

Figure 6:
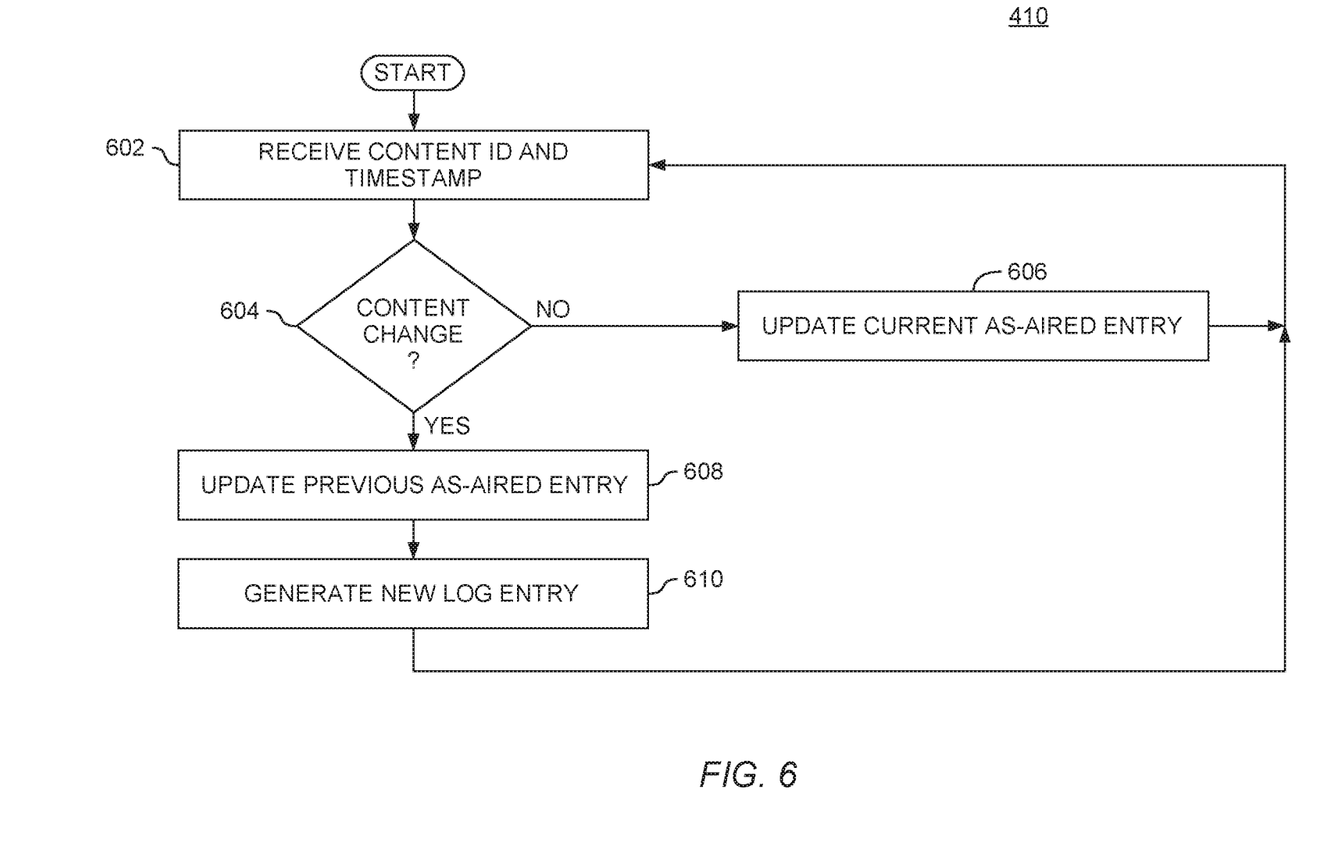
FIG. 6 is a flow chart illustrating updating of an as-aired log, according to one embodiment described herein.

FIG. 6 is a flow chart illustrating updating of an as-aired log, according to one embodiment described herein. In an embodiment, FIG. 6 corresponds with block 410, discussed above in relation to FIG. 4. At block 602, an as-aired log generator module (e.g., the as-aired log generator module 234 illustrated in FIG. 2) receives a content identifier and a timestamp. As discussed above in relation to block 406 illustrated in FIG. 4, in an embodiment a content lookup module provides the content identifier and timestamp to the as-aired log generator module. In an embodiment, the timestamp denotes the time at which the identified content aired.

At block 604, the as-aired log generator module 234 checks the pending as-aired log to determine whether the aired content has changed (i.e., whether the currently airing content has already been included in the as-aired log). In an embodiment, content verification occurs frequently—e.g., every few seconds or portions of a second. This means that the same content will have aired throughout multiple verification cycles. In an embodiment, the as-aired log generator module 234 creates a new as-aired entry each time the content changes, and then waits to update that entry until the content changes again. At block 604, the as-aired log generator module 234 determines whether the most recently aired content (identified by the content ID and timestamp) is the same as the previously airing content. If the content is the same, the flow optionally proceeds to block 606 and back to block 602 for another verification cycle. If the content has changed, the flow proceeds to block 608 and updates the as-aired entry with the time at which the content changed.

In an embodiment, if no as-aired log exists, the as-aired log generator module 234 creates a new log. In an alternative embodiment, at block 606 the as-aired log generator module 234 updates the as-aired log, even if the content has not changed (e.g., by updating a timestamp in the log). As another alternative, the as-aired log generator module 234 can receive an expected schedule from a TLB system (e.g., the TLB system 150 illustrated in FIG. 1) or from another suitable system. The as-aired log generator module 234 can use the expected schedule in generating the as-aired log, modifying the schedule as appropriate based on the content identified as actually airing (e.g., as discussed above in relation to block 408).

If the content has changed, at block 608 the as-aired log generator module 234 updates the previous as-aired entry. In an embodiment, the as-aired log generator module 234 updates an entry identifying the content (e.g., by content ID) and the air times (e.g., using the timestamps received at block 602). In an embodiment, the as-aired log generator module 234 saves the updated as-aired log locally in the verification server 200. In another embodiment, the as-aired log is saved as part of the TLB system, and the TLB interface module 236 saves the as-aired log in the TLB system. In another embodiment, the as-aired log generator module 234 saves the as-aired log in a remote storage location (e.g., the storage 270 illustrated in FIG. 2, or a cloud storage location). In another embodiment, the as-aired log is maintained in volatile memory by the as-aired log generator module 234, and is not saved to a non-volatile location. In this embodiment, the content tracking module 230 could periodically save the as-aired log to a non-volatile location, instead of saving the as-aired log to a non-volatile location with every update.

At block 610, the as-aired log generator module 234 generates a new log entry in the as-aired log. In an embodiment, the as-aired log generator module 234 creates a new entry identifying the aired content (e.g., using the content ID received at block 610) and the starting air time (e.g., using the timestamp received at block 602). In an embodiment, the as-aired log generator module 234 adds this new entry to the as-aired log in volatile memory. In another embodiment, the as-aired log generator module 234 saves the updated as-aired log in non-volatile memory (e.g., locally or in a remote storage location, as discussed above in relation to block 608). The flow then returns to block 602. In an embodiment, the flow illustrated in FIG. 6 continues as long as the network is airing content, to continually update the as-aired log. Alternatively, the flow illustrated in FIG. 6 could operate at designated times or in designated intervals.

Figure 7:
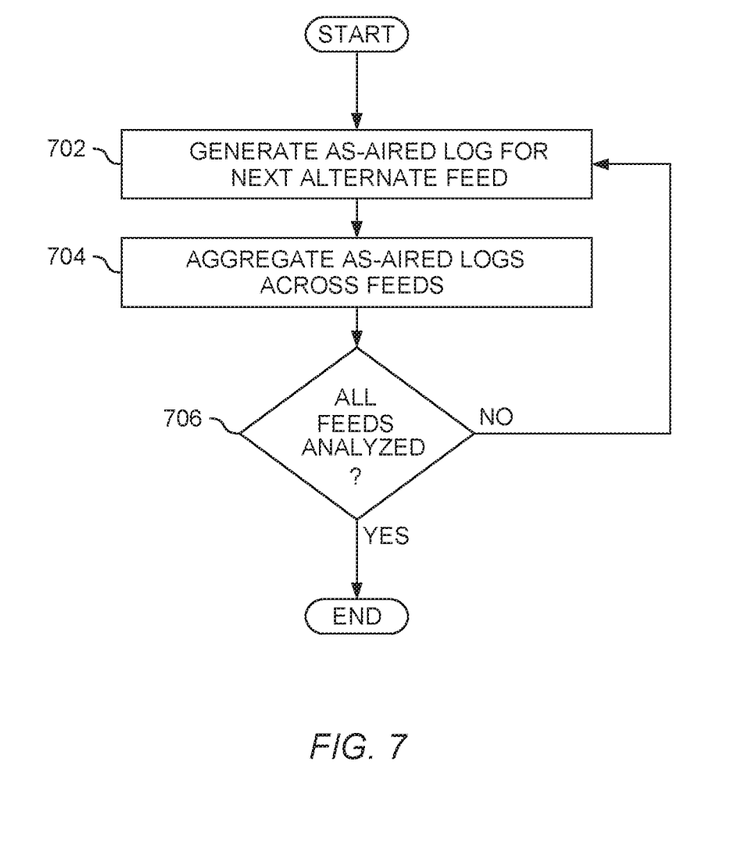
FIG. 7 is a flow chart illustrating automatic verification of multiple alternate feeds of content transmission, according to one embodiment described herein.

FIG. 7 is a flow chart illustrating automatic verification of multiple alternate feeds of content transmission, according to one embodiment described herein. In an embodiment, a television network can provide multiple different content feeds simultaneously. For example, a television network might provide regional sports programming that differs for different regions across the country. The techniques disclosed according to certain embodiments herein can be used to facilitate verification of these multiple alternate feeds.

At block 702, an as-aired log generator module (e.g., the as-aired log generator module 234 illustrated in FIG. 2) generates an as-aired list for the next alternate feed. In an embodiment, the techniques described in relation to FIGS. 4-6 can be used. This disclosure will not be repeated here. The as-aired log generator module 234 can monitor content on the next feed, and generate the corresponding as-aired list.

At block 704, the as-aired log generator module 234 aggregates as-aired list across feeds. In an embodiment, multiple alternate feeds can be monitored simultaneously (e.g., using multiple verification servers 200 or multiple virtual instances of a verification server 200). Alternatively, multiple alternate feeds can be monitored in rapid succession. In both instances, at block 704 the as-aired log generator module 234 aggregates the as-aired logs generated for each feed into a combined list. In an embodiment, the as-aired log generator module 234 can aggregate the as-aired logs for various feeds repeatedly, as the content is verified. In another embodiment, the as-aired log generator module 234 can aggregate the as-aired logs at defined intervals (e.g., after each 30 minute block of programming). At block 706, the as-aired log generator module 234 determines whether all feeds have been analyzed. If so, the flow ends. If not, the flow returns to block 702.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of identifying aired content, comprising:
processing a first audio sample, using a computer processor, to extract an embedded audio watermark;
determining, using the computer processor, a content identifier identifying a first item of programming content, based on the audio watermark, comprising:
determining that a local cache does not include an entry correlating the audio watermark with the content identifier, and in response, retrieving the content identifier from a remote storage location based on the audio watermark;
determining, using the computer processor, a timestamp associated with the first audio sample, based on the audio watermark;
updating, using the computer processor, an as-aired log based on the content identifier and the timestamp;
identifying, using the computer processor, that the first item of programming content has aired, based on the as-aired log;
determining, based on the audio watermark, that the first item of programming content was transmitted using a backup system; and
identifying a technical problem related to airing of content, in response to the determining that the first item of programming content was transmitted using the backup system.

2. The method of claim 1, wherein processing the first audio sample to extract the embedded audio watermark comprises:
identifying a block of audio in the audio sample;
filtering the block of audio;
detecting a watermark symbol in the block of audio; and
decoding the audio watermark based on the watermark symbol.

3. The method of claim 1, wherein updating the as-aired log based on the content identifier and the timestamp further comprises:
providing data related to the content identifier and the timestamp to a Traffic, Log, and Billing (TLB) system at a television studio, wherein the TLB system is configured to update the as-aired log.

4. The method of claim 1, wherein identifying that the first item of programming content has aired, based on the as-aired log, comprises determining compliance with an airtime requirement.

5. The method of claim 1, wherein identifying that the first item of programming content has aired, based on the as-aired log, comprises identifying the technical problem related to airing of content.

6. The method of claim 1, wherein identifying that the first item of programming content has aired, based on the as-aired log, comprises verifying that an item of advertising content has aired, the method further comprising:
generating, using the computer processor, an advertising bill based on verifying that the advertising content has aired.

7. The method of claim 1, wherein the audio watermark is an Open Binding of Content Identifiers (OBID) watermark, and wherein determining, using the computer processor, the timestamp associated with the first audio sample, based on the audio watermark, comprises:
identifying a payload carried by the audio watermark, wherein the payload comprises a plurality of data bits; and
determining the timestamp based on the plurality of data bits.

8. The method of claim 1, wherein the audio watermark is an Open Binding of Content Identifiers (OBID) watermark, and wherein determining, using the computer processor, the content identifier identifying the first item of programming content, based on the audio watermark, comprises:
identifying a packet associated with the audio watermark based on a synchronization symbol, the packet comprising a plurality of data bits; and
determining the content identifier based on the plurality of data bits.

9. The method of claim 1, further comprising:
receiving a second audio sample, wherein the first audio sample relates to a first content feed, the second audio sample relates to a second content feed, and the first and second content feeds are different;
processing the second audio sample, using the computer processor, to extract an embedded second audio watermark;
determining, using the computer processor, a second content identifier identifying a second item of programming content, based on the second audio watermark;
determining, using the computer processor, a second timestamp associated with the second audio sample based on the second audio watermark;
updating, using the computer processor, a second as-aired log based on the second content identifier and the second timestamp; and
aggregating the as-aired log and the second as-aired log to generate an aggregated as-aired log, wherein identifying, using the computer processor, that the first item of programming content has aired, is based on the aggregated as-aired log.

10. The method of claim 1, wherein the first audio sample is received at a television studio, and wherein the first item of programming content is audio-visual content transmitted by the television studio.

11. The method of claim 1,
wherein the audio watermark does not include the content identifier,
wherein the remote storage location relates to a registration authority, and
wherein the registration authority maintains a correlation between the audio watermark and the content identifier.

12. The method of claim 1, wherein determining that the first item of programming content was transmitted using the backup system is further based on the as-aired log.

13. A computer program product for identifying aired content, the computer program product comprising:
a non-transitory computer-readable storage medium having computer-readable program code embodied therewith, the computer-readable program code executable by one or more computer processors to perform an operation, the operation comprising:
processing a first audio sample to extract an embedded audio watermark;
determining a content identifier identifying a first item of programming content, based on the audio watermark, comprising:
determining that a local cache does not include an entry correlating the audio watermark with the content identifier, and in response, retrieving the content identifier from a remote storage location based on the audio watermark;
determining a timestamp associated with the first audio sample, based on the audio watermark;
updating an as-aired log based on the content identifier and the timestamp;
identifying that the first item of programming content has aired, based on the as-aired log;
determining, based on the audio watermark, that the first item of programming content was transmitted using a backup system; and
identifying a technical problem related to airing of content, in response to the determining that the first item of programming content was transmitted using the backup system.

14. The computer program product of claim 13, wherein processing the first audio sample to extract the embedded audio watermark comprises:
identifying a block of audio in the audio sample;
filtering the block of audio;
detecting a watermark symbol in the block of audio; and
decoding the audio watermark based on the watermark symbol.

15. The computer program product of claim 13, wherein updating the as-aired log based on the content identifier and the timestamp further comprises:
providing data related to the content identifier and the timestamp to a Traffic, Log, and Billing (TLB) system at a television studio, wherein the TLB system is configured to update the as-aired log.

16. The computer program product of claim 13, the operation further comprising:
receiving a second audio sample, wherein the first audio sample relates to a first content feed, the second audio sample relates to a second content feed, and the first and second content feeds are different;
processing the second audio sample to extract an embedded second audio watermark;
determining a second content identifier identifying a second item of programming content, based on the second audio watermark;
determining a second timestamp associated with the second audio sample, based on the second audio watermark;
updating a second as-aired log based on the second content identifier and the second timestamp; and
aggregating the as-aired log and the second as-aired log to generate an aggregated as-aired log, wherein identifying that the first item of programming content has aired is based on the aggregated as-aired log.

17. A system, comprising:
a processor; and
a memory storing a program, which, when executed on the processor, performs an operation, the operation comprising:
processing a first audio sample to extract an embedded audio watermark;
determining a content identifier identifying a first item of programming content, based on the audio watermark, comprising:
determining that a local cache does not include an entry correlating the audio watermark with the content identifier, and in response, retrieving the content identifier from a remote storage location based on the audio watermark;
determining a timestamp associated with the first audio sample, based on the audio watermark;
updating an as-aired log based on the content identifier and the timestamp;
identifying that the first item of programming content has aired, based on the as-aired log;
determining, based on the audio watermark, that the first item of programming content was transmitted using a backup system; and
identifying a technical problem related to airing of content, in response to the determining that the first item of programming content was transmitted using the backup system.

18. The system of claim 17, wherein processing the first audio sample to extract the embedded audio watermark comprises:
identifying a block of audio in the audio sample;
filtering the block of audio;
detecting a watermark symbol in the block of audio; and
decoding the audio watermark based on the watermark symbol.

19. The system of claim 17, wherein updating the as-aired log based on the content identifier and the timestamp further comprises:
providing data related to the content identifier and the timestamp to a Traffic, Log, and Billing (TLB) system at a television studio, wherein the TLB system is configured to update the as-aired log.

20. The system of claim 17, the operation further comprising:
receiving a second audio sample, wherein the first audio sample relates to a first content feed, the second audio sample relates to a second content feed, and the first and second content feeds are different;
processing the second audio sample to extract an embedded second audio watermark;

determining a second content identifier identifying a second item of programming content, based on the second audio watermark;
determining a second timestamp associated with the second audio sample, based on the second audio watermark;
updating a second as-aired log based on the second content identifier and the second timestamp; and
aggregating the as-aired log and the second as-aired log to generate an aggregated as-aired log, wherein identifying that the first item of programming content has aired is based on the aggregated as-aired log.

\* \* \* \* \*